United States Patent
McKennis et al.

(10) Patent No.: US 9,523,028 B2
(45) Date of Patent: Dec. 20, 2016

(54) THERMAL INSULATING FLUIDS

(71) Applicant: TETRA Technologies, Inc., The Woodlands, TX (US)

(72) Inventors: Jeffrey McKennis, The Woodlands, TX (US); Marshall Chiasson, Spring, TX (US); Mohammad Hossaini, Houston, TX (US); Nam-Sook Bae, The Woodlands, TX (US)

(73) Assignee: Tetra Technologies, Inc., The Woodlands, TX (US)

( * ) Notice: Subject to any disclaimer, the term of this patent is extended or adjusted under 35 U.S.C. 154(b) by 3 days.

(21) Appl. No.: 14/521,750

(22) Filed: Oct. 23, 2014

(65) Prior Publication Data

US 2015/0045260 A1 Feb. 12, 2015

Related U.S. Application Data

(62) Division of application No. 13/043,033, filed on Mar. 8, 2011, now Pat. No. 8,895,476.

(51) Int. Cl.
| | |
|---|---|
| *C09K 8/54* | (2006.01) |
| *C09K 8/68* | (2006.01) |
| *C09K 8/528* | (2006.01) |
| *C09K 8/524* | (2006.01) |
| *C09K 8/532* | (2006.01) |
| *C09K 8/60* | (2006.01) |
| *C09K 8/02* | (2006.01) |

(Continued)

(52) U.S. Cl.
CPC ............... *C09K 8/34* (2013.01); *C09K 8/035* (2013.01); *C09K 8/665* (2013.01); *C09K 8/68* (2013.01); *C09K 8/86* (2013.01); *C09K 8/882* (2013.01); *C09K 8/905* (2013.01); *E21B 36/003* (2013.01)

(58) Field of Classification Search
CPC ......... C09K 8/504; C09K 8/5045; C09K 8/57; C09K 8/572; C09K 8/575; C09K 8/84; C09K 8/845; Y10S 507/926
USPC ....... 507/103, 203, 229, 239, 209, 224, 242, 507/244, 257, 261, 268
See application file for complete search history.

(56) References Cited

U.S. PATENT DOCUMENTS

| | | |
|---|---|---|
| 3,539,406 A | 11/1970 | Lissant |
| 4,219,429 A | 8/1980 | Allen et al. |

(Continued)

FOREIGN PATENT DOCUMENTS

WO 2004096708 A1 11/2004

OTHER PUBLICATIONS

Javora, Paul; Pearcy, Rick; Wang, Xiaolan; Stevens; Dick; Qu, Qi; "A Decade of Experience—The Water Based Thermal Insulating Packer Fluid;" Society of Petroleum Engineers, 2008 SPE Annual Technical Conference and Exhibition; Sep. 21-24, 2008; 7 pages; Denver, CO. USA.

(Continued)

*Primary Examiner* — Aiqun Li
(74) *Attorney, Agent, or Firm* — D'Ambrosio & Menon, PLLC; Usha Menon

(57) ABSTRACT

Aqueous and substantially anhydrous fluids having particularly low thermal conductivities and variable densities are disclosed. The fluids include: one or more organic and/or inorganic salts and at least one aprotic polar organic solvent, a mixture of aprotic and protic polar organic solvents, and/or a polar organic solvent having both protic and aprotic polar functional group linkages. The fluids optionally include one or more viscosifying agents and are free of cross-linking agents. Methods for formulating and using the fluids are also disclosed.

5 Claims, 8 Drawing Sheets

(51) Int. Cl.
  *C09K 8/34* (2006.01)
  *C09K 8/035* (2006.01)
  *C09K 8/66* (2006.01)
  *C09K 8/88* (2006.01)
  *C09K 8/90* (2006.01)
  *E21B 36/00* (2006.01)
  *C09K 8/86* (2006.01)

(56) References Cited

U.S. PATENT DOCUMENTS

| | | |
|---|---|---|
| 4,292,183 A | 9/1981 | Sanders |
| 4,362,820 A | 12/1982 | Kaplan |
| 4,464,274 A | 8/1984 | House |
| 4,490,261 A | 12/1984 | Heilweil |
| 4,494,610 A | 1/1985 | Walker |
| 4,498,994 A | 2/1985 | Heilweil |
| 4,514,310 A | 4/1985 | Heilweil |
| 4,528,104 A | 7/1985 | House et al. |
| 4,609,476 A | 9/1986 | Heilweil |
| 4,978,466 A | 12/1990 | Sirotenko et al. |
| 5,002,673 A | 3/1991 | Williams et al. |
| 5,607,901 A | 3/1997 | Toups, Jr. et al. |
| 5,876,619 A | 3/1999 | Skaggs et al. |
| 6,291,405 B1 | 9/2001 | Lee et al. |
| 6,489,270 B1 | 12/2002 | Vollmer et al. |
| 6,632,779 B1 | 10/2003 | Vollmer et al. |
| 6,908,886 B2 | 6/2005 | Jones et al. |
| 7,198,106 B2 | 4/2007 | Hayhurst et al. |
| 7,211,549 B2 | 5/2007 | Patel et al. |
| 7,896,078 B2 | 3/2011 | Wang et al. |
| 2002/0019317 A1 | 2/2002 | Palmer et al. |
| 2003/0220202 A1 | 11/2003 | Foxenberg et al. |
| 2008/0223596 A1 | 9/2008 | Ezell et al. |
| 2008/0224087 A1 | 9/2008 | Ezell et al. |
| 2008/0227665 A1 | 9/2008 | Ezell et al. |
| 2010/0025615 A1 | 2/2010 | Lo et al. |
| 2011/0028356 A1 | 2/2011 | Jones et al. |

OTHER PUBLICATIONS

Javora, Paul; Wang, Xiaolan; Qu, Qi; Poole, Gary; Dunbar, Shane; Sanford, Jack; Cordeddu, Crisitina; "Super-insulating packer fluid minimizes flow assurance concerns;" World Oil Apr. 2008, pp. 159-161; ENI Petroleum & BJ Services Company, USA.

El-Dossoki, Farid; "Refractive Index and Density Measurements for Selected Binary Protic-Protic, Aprotic-Aprotic, and Aprotic-Protic Systems at Temperatures from 298.15 K to 308.15 K;" Journal of the Chinese Chemical Society, 2007; pp. 1129-1137; Suez-Canal University, Port-Said, Egypt.

Technical Data Sheet of GEO Drilling Fluids, Inc., 2010.

| Solvent | Type of Fluid[†] | Electric Dipole Moment[*#] | Dielectric Constant[*] |
|---|---|---|---|
| Dimethyl sulfoxide | Aprotic | 4.10 | 48.9 |
| N-Methyl-2-pyrrolidone | Aprotic | 4.09 | 32.2 |
| N,N-Dimethylformamide | Aprotic | 3.86 | 36.7 |
| Acetonitrile | Aprotic | 3.84 | 36 |
| Cyclohexanone | Aprotic | 3.01 | 18.3 |
| Methyl Ethyl Ketone | Aprotic | 2.76 | 18.5 |
| Acetone | Aprotic | 2.68 | 20.7 |
| Ethylene Glycol | Protic | 2.28 | 37 |
| Ethyl Acetate | Aprotic | 1.87 | 6.02 |
| Butyl Acetate | Aprotic | 1.86 | 5.0 |
| n-Butyl Alcohol | Protic | 1.75 | 17.5 |
| Acetic Acid | Protic | 1.74 | 6.15 |
| 2-Propanol | Protic | 1.66 | 18.3 |
| Ethanol | Protic | 1.65 | 24 |
| Tetrahydrofuran | Aprotic | 1.63 | 7.5 |
| Cyclohexylamine | Aprotic | 1.25 | 4.7 |
| Ethylamine | Aprotic | 1.22 | 6.5 |
| Diethyl Ether | Aprotic | 1.15 | 4.3 |
| Diethylamine | Aprotic | 1.1 | 3.7 |

[†] Fluid is polar unless otherwise indicated
[*] Measured at ~ 25 °C
[#] Measured in Debyes

FIG. 1

Effect of Aprotic Solvent on Thermal Conductivity of Viscosified Fluid

| Fluid * | Ethylene Glycol (vol %) | N-Methyl-2-pyrrolidone (vol %) | 14.2 ppg $CaBr_2$ (Vol %) | Thermal Conductivity (k, BTU/HrFt°F) |
|---|---|---|---|---|
| 11.6 ppg Formulation 1 | 57 |  | 43 | 0.18 |
| 11.6 ppg Formulation 2 | 26 | 25 | 49 | 0.17 |
| 11.6 ppg Formulation 3 |  | 47 | 53 | 0.15 |

* Acylamide/AMPS Polymer level, 10 lb/bbl

FIG. 2

Thermal Conductivities for Polar Organic Fluids with Varying Types and Numbers of Aprotic and Protic Functional Group Linkages

| Fluid Chemical Formula | Fluid Name | Polar Functional Group Linkages | Thermal Conductivity (k) (BTU/hr* ft* °F) |
|---|---|---|---|
| $HOCH_2CH_2OCH_2CH_2OH$ | Diethylene Glycol | Alcohol / Ether / Alcohol | 0.12 |
| $HOCH_2CH_2OCH_2CH_2OH + n\text{-}C_4H_9OH$ | Diethylene Glycol and n-Butyl Alcohol | Alcohol / Ether / Alcohol + Alcohol | 0.10 |
| $HOCH_2CH_2OCH_2CH_2OC_4H_9$ | Monobutyl Ether Diethylene Glycol | Alcohol / Ether / Ether | 0.09 (25 % reduction compared to diethylene glycol) |
| $HOCH_2CH_2OH$ | Ethylene Glycol | Alcohol / Alcohol | 0.15 |
| $HOCH_2CH_2OH + C_2H_5OH$ | Ethylene Glycol and Ethyl Alcohol | Alcohol / Alcohol + Alcohol | 0.14 |
| $HOCH_2OC_2H_5$ | Monoethyl Ether Ethylene Glycol (2-Ethoxyethanol) | Alcohol / Ether | 0.10 (33% reduction compared to ethylene glycol) |
| $CH_3OCH_2CH_2O(CH_2CH_2O)_2OCH_2CH_2OCH_3$ | Dimethyl Ether Tetraethyleneglycol | Ether/Ether/Ether/Ether/Ether | 0.06 |
| $CH_3CO_2CH_2CH_2OCH_2CH_2OC_4H_9$ | Monobutyl Ether Diethylene Glycol Acetate | Ester/Ether/Ether | 0.06 (33% reduction compared to monobutyl ether of ethylene glycol) |
| $C_6H_5COOCH_2CH_2OCH_2CH_2OOCC_6H_5$ | Diethylene glycol dibenzoate | Ester/Ether/Ester | 0.06 |
| $(CH_2)_5CO$ | Cyclohexanone | Ketone | 0.05 |

FIG. 4

Comparison of Effect of Water on Thermal Conductivity for Various Formulations That Include N-Methyl-2-pyrrolidone

| Fluid | Hydration State | Organic Solvent | Thermal Conductivity (k) (BTU/hrft°F) |
|---|---|---|---|
| 11.6 ppg CaCl$_2$ Brine | Aqueous | None | 0.29 |
| 11.6 ppg Formulation (Aqueous ZnBr$_2$ based) | Aqueous | N-Methyl-2-pyrrolidone | 0.10 |
| 11.6 ppg Formulation (Aqueous CaBr$_2$ based) | Aqueous | N-Methyl-2-pyrrolidone | 0.10 |
| 11.6 ppg Formulation (ZnBr$_2$ based) (No viscosifing agent) | Anhydrous | N-Methyl-2-pyrrolidone | 0.085 |
| 12.5 ppg CaBr$_2$ Brine | Aqueous | None | 0.23 |
| 12.5 ppg Formulation (CaBr$_2$ based) | Aqueous | N-Methyl-2-pyrrolidone | 0.17 |
| 14.7 ppg Formulation (ZnBr2 based) (No viscosifing agent) | Anhydrous | N-Methyl-2-pyrrolidone | 0.08 |

FIG. 5

| Thermal Conductivity Data at Different Temperatures for a 12.5 ppg Fluid Formulation Comprising N-Methyl-2-pyrrolidone ||
|---|---|
| Temperature (°F) | Thermal Conductivity (k) (BTU/hr*ft* °F) |
| 72 | 0.17 |
| 130 | 0.16 |
| 175 | 0.16 |
| 204 | 0.15 |
| 243 | 0.15 |

| Fluid Viscosities at Various Time Intervals for Different Fluid Formulations (Measured at 180 °F) | | | | |
|---|---|---|---|---|
| | Fluid A | Fluid B | Fluid C | Fluid D |
| CHP | 9.5 ppg | 10.1 ppg | 10.3 ppg | 10.3 ppg |
| Polymer (lbs/bbl) (ppb) | 7 ppb | 7 ppb | 5 ppb | 5 ppb |
| Initial Viscosity (cP) | 240 | 260 | 70 | 150 |
| 2 days | 230 | 265 | 85 | 180 |
| 4 days | 250 | 280 | 90 | 180 |
| 1 week | - | - | 90 | 190 |
| 2 weeks | - | 275 | 90 | 190 |
| 1 month | - | 280 | 90 | 190 |

| Water Activity for Aprotic, Protic, and Mixed Aprotic/Protic Solvents ||
|---|---|
| Solvent * | % Relative Humidity |
| N-Methy Pyrrolidone (Aprotic) | 26 |
| Ethylene Glycol (Protic) | 30 |
| Glycerol (Protic) | 17 |
| Diethylene Glycol Monobutyl Ether (Mixed Aprotic/Protic) | 78 |
| * Solvents contain 10 % $H_2O$ ||

FIG. 8

THERMAL INSULATING FLUIDS

CROSS-REFERENCE TO RELATED APPLICATION(S)

This application claims the benefit, and is a divisional application of prior U.S. application Ser. No. 13/043,033 filed Mar. 8, 2011 entitled "Thermal Insulating Fluids," which is incorporated herein by reference in its entirety.

BACKGROUND

Fluids are used in a variety of capacities in connection with downhole deep well applications. For example, packer fluids, completion fluids, workover fluids and fracturing fluids, to name a few, each serve a critical role in such applications. The physical and chemical properties exhibited by a fluid strongly influence the particular niche for which the fluid is most suited. Low thermal conductivity is a particularly important property required of many types of downhole deep well application fluids. Fluids are typically pumped to significant depths in downhole applications where they are exposed to highly elevated temperatures. A fluid's favorable thermal conductivity characteristics can make it an excellent choice for any downhole use in which thermal insulation is crucial to success of the operation. In addition to low thermal conductivity, high thermal stability at elevated wellbore temperatures and favorable rheological properties such as a reduced viscosity upon mechanical agitation at ambient temperatures are also desired fluid characteristics.

SUMMARY

Embodiments of the invention are directed to thermal insulating fluids having particularly low thermal conductivities, variable densities, favorable thermal stability at elevated temperatures, favorable corrosion and gas hydrate inhibition properties, and relatively high viscosities at elevated temperatures. Embodiments of the invention may be broadly categorized as being directed to either aqueous thermal insulating fluids or substantially anhydrous thermal insulating fluids. This categorization is not intended to be limiting but is provided merely as a means for distinguishing between various embodiments of the invention.

For the purposes of this disclosure, the terms "thermal insulating fluid," "thermally insulative fluid," "fluid formulation," "fluid," and "formulation" may be used interchangeably herein.

To obtain fluids with lower thermal conductivities than aqueous-based fluids, protic organic solvents such as alcohols and polyols (e.g., glycols) have recently been used in the formulation of such fluids. Through the addition of halide salts, typically in an aqueous state, high-density fluid formulations using protic organic solvents may be produced.

The chemical structure of an organic solvent strongly influences its thermal conductivity characteristics as well as its ability to solubilize various inorganic and organic salts. Heretofore, the advantageous use of aprotic polar organic solvents in lieu of, or in combination with, protic organic solvents to prepare fluids with variable densities and lower thermal conductivities than those prepared with protic solvents alone has not been recognized. Applicants have determined that a wide range of aprotic polar organic solvents are able to effectively solubilize various inorganic and organic salts. The solubilization of these salts permits the formulation of variable density fluids suitable for use in HPHT (high pressure, high temperature) well applications.

The particularly low thermal conductivities achieved by fluids according to embodiments of the invention that include aprotic polar organic solvent(s) and/or polar organic solvents having aprotic functional group linkage(s) make them excellent candidates for use as thermal insulating fluids in wellbore applications. Moreover, until Applicants' invention, the effectiveness with which a wide range of aprotic polar organic solvents are able to solubilize salts to produce variable density fluids was unrecognized in the art. As such, not only can variable density, low thermally conductive fluids according to embodiments of the invention be used in numerous capacities in connection with oil and gas applications (e.g. as insulating fluids, packer fluids, completion fluids, workover fluids, drilling fluids, and fracturing fluids), but they may also be applied across a wide range of industries beyond oil and gas.

In a general embodiment of the invention, a thermal insulating fluid comprises: one or more organic and/or inorganic salts, an aprotic polar organic solvent, a viscosifying agent, and water. During formulation, the organic and/or inorganic salts may initially be present and introduced in solid phase and/or in the form of an aqueous brine solution. Introduction of salts to the thermal insulating fluid provides the fluid with a suitable density for use as a downhole fluid.

Typically, in this embodiment, only an amount of water sufficient to hydrate or solubilize the viscosifying agent is added to the fluid. Water is not necessary to dissolve the salts because the aprotic polar organic solvent suitably solubilizes the salts. As a consequence, in this embodiment and other embodiments of the invention directed to aqueous thermal insulating fluids, the fluid comprises a substantially reduced amount of water as compared to conventional aqueous-based insulating fluids. As a result, aqueous thermal insulating fluids according to embodiments of the invention are less corrosive than conventional aqueous-based insulating fluids.

The viscosifying agent may be one or more natural and/or synthetic polymers. For example, natural polymers such as scerloglucan, synthetic polymers such as polyacrylic polymers and derivatives thereof, and/or inorganic polymers may be used. In addition, mixtures of polymers as well as copolymers (i.e. polymers comprising more than one type of repeating monomeric unit) may be used such as, for example, mixtures and/or copolymers of acrylic acid and 2-acrylamido-2-methylpropanesulfonic acid (referred to as AMPS polymers). The polymers may include cationic and/or anionic monomeric species. Moreover, a mixture of one or more polymers and one or more organic and/or inorganic salt(s) (e.g. a polycationic polymer containing quaternary ammonium groups in salt form) may be included in thermal insulating fluids according to embodiments of the invention. Polymers of vinyl pyrrolidone, polyacrylic derivatives or other polymers may be used as well. A separate cross-linking agent is generally not required or added to the polymer(s). That is, fluid formulations in accordance with embodiments of the invention may include one or more viscosifying agents while simultaneously being free of a cross-linking agent. Thus, fluids according to embodiments of the invention advantageously possess highly favorable thermal conductivity characteristics while avoiding some of the problems associated with the use of cross-linking agents such as difficulties in removing the fluid during workover operations.

In another embodiment of the invention, a thermal insulating fluid comprises: one or more organic and/or inorganic salts, a mixture of at least one aprotic polar organic solvent and at least one protic polar organic solvent, a viscosifying agent, and water. The mixture of aprotic and protic polar organic solvents may be formulated in such a manner that the ratio of the concentration of aprotic polar organic solvent(s) to the concentration of protic polar organic solvent(s) is at least about 1:4 or greater. In a more specific embodiment of the invention, the ratio of the concentration of aprotic polar organic solvent(s) to the concentration of protic polar organic solvent(s) is in the range of about 1:4 to about 4:1. Stated another way, the proportion of aprotic polar organic solvent(s) in the mixture of aprotic and protic polar organic solvents may be in the range of about 20% to about 80%. However, in other embodiments of the invention, the mixture may be formed according to any proportion, including mixtures that include only aprotic polar organic solvent(s).

In another embodiment of the invention, a thermal insulating fluid comprises: one or more organic and/or inorganic salts, at least one polar organic solvent having one or more protic polar functional group linkages and one or more aprotic polar functional group linkages, a viscosifying agent, and water. The polar organic solvent with aprotic and protic functional group linkages may be, for example, an alcohol ester, an alcohol or polyol ether, and/or an alcohol or polyol amide.

In a more specific embodiment of the invention, a thermal insulating fluid comprises: one or more organic and/or inorganic salts and at least one polar organic solvent in which a ratio of aprotic polar functional group linkage(s) to protic polar functional group linkage(s) is at least about 1:2 or greater. Stated another way, aprotic polar functional group linkages may represent about 33% or greater of all functional group linkages in the polar organic solvent. In one or more exemplary embodiments, diethylene glycol butyl ether may be used as an organic solvent comprising both aprotic and protic polar functional group linkages. However, it should be noted that the organic solvent(s) used may include any number of aprotic and protic linkages.

In another more specific embodiment of the invention, a hydrocarbon chain associated with an aprotic functional group linkage in a polar organic solvent comprises at least three carbon atoms. In an even more specific embodiment of the invention, the hydrocarbon chain comprises at least four carbon atoms. For example, in an organic compound comprising two ether linkages and one ester linkage (e.g. R'''—O—R''—O—R'—COO—R), at least one of R''', R'', R', and R may comprise at least three carbon atoms, or in more specific embodiments, at least four carbon atoms. Applicants have determined that polar organic solvents having hydrocarbon chains comprising at least three carbon atoms exhibit particularly low thermal conductivity characteristics while still being able to adequately dissolve salts thereby making them excellent fluids for use in connection with oil and gas and other industrial applications.

As in those embodiments of the invention in which the fluid comprises an aprotic polar organic solvent, embodiments of the invention in which the fluid comprises a mixture of protic and aprotic polar organic solvent(s) and those in which the fluid comprises a polar organic solvent comprising aprotic and protic functional group linkages, the fluid may further comprise a viscosifying agent and water added to the fluid in an amount sufficient to hydrate or solubilize the viscosifying agent. Any of the polymer(s) and mixtures, derivatives, and combinations thereof mentioned earlier may be used. In addition, the fluid may be free of a cross-linking agent.

In accordance with one or more embodiments of the invention, any of the fluids previously described may instead be substantially free of added water. In those substantially anhydrous embodiments in which the fluid is substantially free of added water, a minimal amount of water may be present in the fluid as a result of potential hygroscopic characteristics of the salt(s) and/or the solvent(s). A viscosifying agent may be added to the fluid, or in the alternative, the fluid may be free of a viscosifying agent. A cross-linking agent is not required to obtain suitable viscosification. That is, similarly to the aqueous embodiments, substantially anhydrous fluids according to embodiments of the invention may include one or more viscosifying agents while also being free of a cross-linking agent. Any of the polymer(s) and mixtures, derivatives, and combinations thereof mentioned earlier may be used.

Any of the fluid formulations according to embodiments of the invention may be free of an ionic liquid. An ionic liquid for the purposes of this disclosure shall be defined as a salt in the liquid phase that comprises only anions and cations of the salt. Further, fluid formulations according to embodiments of the invention may be solids-free. That is, the fluid formulations may be devoid of any compounds in solid phase.

A method of introducing into a wellbore a fluid according to any embodiment of the invention is also disclosed. The method comprises: introducing the fluid into the wellbore; and using the fluid as at least one of: a fracturing fluid, a packer fluid, a completion fluid, a drilling fluid, a workover fluid, and a thermal insulating fluid.

A method for formulating an aqueous thermal insulating fluid is disclosed. In certain embodiments, the method comprises: slowly adding a viscosifying agent with strong mixing to an aqueous solution comprising one or more inorganic and/or organic salts. The viscosifying agent may be, for example, a polyacrylic polymer or a co-polymeric blend. Solid salt(s) may be added to the mixture along with the viscosifying agent or at a later time. Various additives such as corrosion inhibitors, etc. may be present in the formulation at the time of addition of the viscosifying agent or may be added a later time. The addition of excess water is generally not required for hydration or solubilization of the polymer.

The method further comprises adding at least one of: one or more aprotic polar organic solvents, one or more polar organic solvents comprising aprotic and protic functional group linkages, and a mixture of at least one aprotic polar organic solvent and at least one protic polar organic solvent to the formulation and mixing the resulting fluid for at least about 45 minutes. Mixing is continued until the fluid is clear. Care should be taken so as to avoid entrainment of air in the fluid due to excessively rapid mixing. Additional aprotic and/or protic organic solvents may be added to the formulation as well. The method is generally carried out at ambient temperature and may be modified depending on the nature of the polymer(s) and/or the solvent(s) used.

In one or more embodiments of the invention, the mode and order in which various components of the fluid are mixed may be altered. For example, in another embodiment of the invention, a method for formulating an aqueous thermal insulating fluid comprises adding one or more viscosifying agents to at least one of: one or more aprotic polar organic solvents, one or more polar organic solvents comprising aprotic and protic functional group linkages, and a mixture of at least one aprotic polar organic solvent and at least one protic polar organic solvent. The addition of the viscosifying agent(s) may be accompanied by strong mixing for an extended period of time and may be followed by the addition of one or more salts in a solid phase or an aqueous salt solution. The method, and in particular, the mode and order of mixing is polymer dependent and may be altered depending on the particular formulation being produced.

A method for formulating a substantially anhydrous thermal insulating fluid is also disclosed. The method comprises dissolving—at an elevated temperature—one or more salts in one or more polar organic solvents including at least one of: one or more aprotic polar organic solvents, one or more polar organic solvents comprising aprotic and protic functional group linkages, and a mixture of at least one aprotic polar organic solvent and at least one protic polar organic solvent. The method further comprises adding one or more viscosifying agents to the formulation. The formulation is mixed strongly both prior to and after the addition of the viscosifying agent(s). In certain embodiments of the invention, the viscosfiying agent(s) is added to the formulation after the salt(s) have dissolved and while the formulation is still at an elevated temperature. However, in other embodiments, the mode and order of mixing may be altered in dependence on the nature of the organic solvent(s), polymer(s), and/or salt(s) used.

The method for formulating an aqueous thermal insulating fluid and/or the method for formulating a substantially anhydrous thermal insulating fluid may, in certain embodiments, further comprise: increasing a concentration of aprotic polar organic solvent(s) relative to a concentration of protic polar organic solvent(s) in order to lower the thermal conductivity of the fluid.

These and other embodiments of the invention will be described in more detail through reference to the following drawings in the detailed description that follows.

BRIEF DESCRIPTION OF THE DRAWINGS

FIG. 1 is table showing the dipole moments and dielectric constants for various aprotic and protic compounds.

FIG. 2 is a table providing thermal conductivity measurements for three different fluid formulations comprising ethylene glycol and N-methyl-2-pyrrolidone in varying proportions.

FIG. 4 is a table illustrating thermal conductivities for various polar organic fluids with varying numbers of aprotic and protic functional group linkages.

FIG. 5 is a table that illustrates the effect of water on the thermal conductivities of various fluid formulations that comprise N-methyl-2-pyrrolidone.

FIG. 8 is a table showing the relative humidity of various protic polar organic solvents, aprotic polar organic solvents, and polar organic solvents having both protic and aprotic functional group linkages.

DETAILED DESCRIPTION

Figure 3:
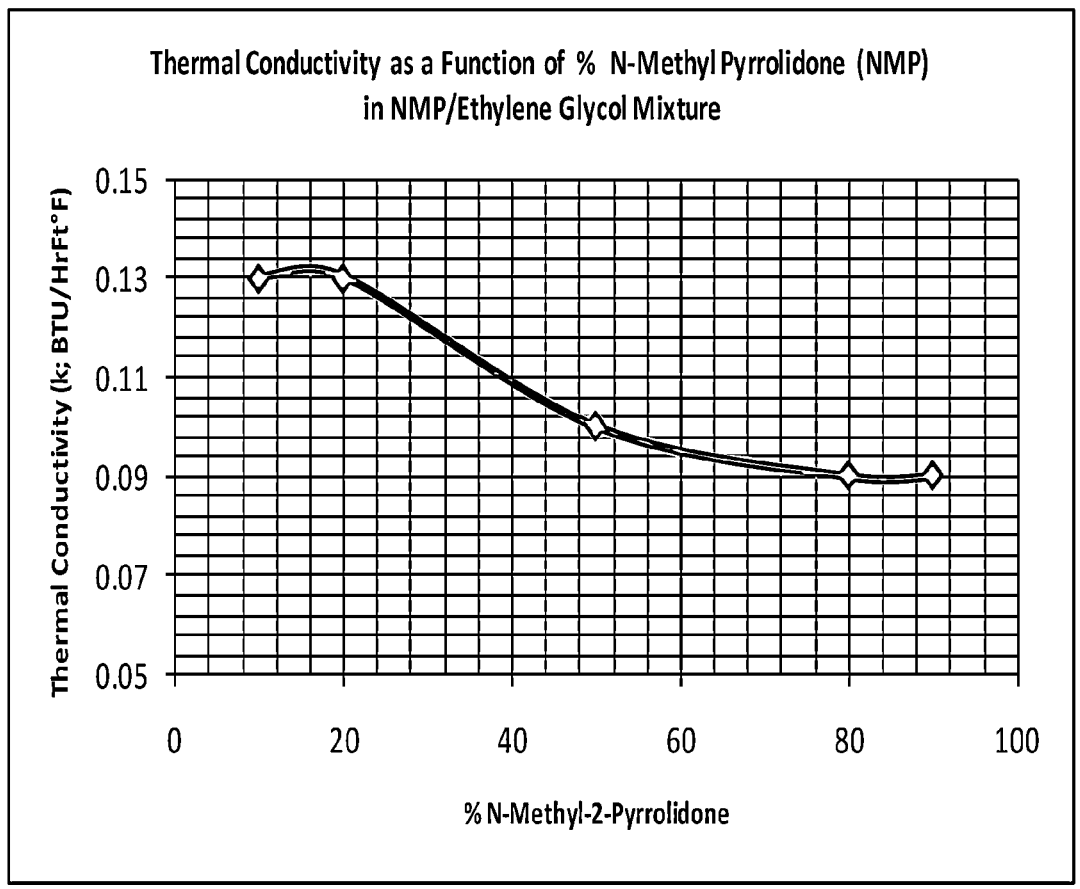
FIG. 3 is a plot of the thermal conductivity of a mixture of N-methyl-2-pyrrolidone and ethylene glycol as a function of the percentage of N-methyl-2-pyrrolidone in the mixture.

One or more embodiments of the invention are directed to aqueous thermal insulating fluids comprising: one or more organic and/or inorganic salts, at least one viscosifying agent, and water. In various embodiments, the fluid further comprises at least one aprotic polar organic solvent. In other embodiments the fluid comprises a mixture of aprotic and protic polar organic solvents. In still other embodiments, a polar organic solvent having intramolecular protic and aprotic polar functional group linkages is included in the fluid. Embodiments that represent combinations of one or more of the above embodiments are also within the scope of the invention. Further, the fluid may be free of a cross-linking agent.

One or more alternative embodiments of the invention are directed to substantially anhydrous thermal insulating fluids in which the fluids are substantially free of added water beyond that which may be present due to hygroscopic characteristics of the salt(s) and/or solvent(s) in the fluid. In some embodiments, the substantially anhydrous thermally insulating fluid comprises: one or more organic and/or inorganic salts and at least one aprotic polar organic solvent. In other embodiments, the substantially anhydrous fluid comprises: one or more organic and/or inorganic salts and a mixture of aprotic and protic polar organic solvents. In still other embodiments, the fluid comprises: one or more organic and/or inorganic salt(s) and at least one polar organic solvent having intramolecular protic and aprotic polar functional group linkages. Embodiments that represent combinations of one or more of the substantially anhydrous fluids described above are also within the scope of the invention. Moreover, in some embodiments, the substantially anhydrous fluids may be free of an added viscosifying agent, while in other embodiments, a viscosifying agent among any of those previously disclosed may be added to the formulation. Substantially anhydrous fluids according to embodiments of the invention may be free of a cross-linking agent.

As described above, thermal insulating fluids according to embodiments of the invention comprise one or more organic and/or inorganic salts dissolved therein. Examples of suitable inorganic salts include halides of alkali, alkaline earth and transition metals and carboxylates including formates and acetates of alkali, alkaline earth and transition metals. The alkali, alkaline earth, and transition metals may be selected from sodium, potassium, calcium, magnesium, aluminum, barium, iron, nickel, cobalt, manganese, zinc and strontium. Specific examples of suitable salts include, but are not limited to, potassium chloride, sodium chloride, sodium bromide, calcium chloride, calcium bromide, zinc bromide, zinc chloride, formates of alkali and alkaline earth metals, acetates of alkali and alkaline earth metals, and mixtures thereof.

In aqueous embodiments of the invention, the salts may be initially present and introduced to the formulation in the form of an aqueous brine solution. Examples of suitable aqueous brines include brines formed from any of the salts described above. Alternatively, in the substantially anhydrous embodiments, the salt(s) may be added to the formulation in solid phase. Addition of solid salt provides the advantage of increasing the density of the fluid while minimizing the amount of water in the fluid, which in turn results in a lower thermal conductivity than that of a comparable fluid with a larger amount of water.

The degree of polarity of a solvent is generally determined by its electric dipole moment and its dielectric constant which serve as indicators of the solvent's ability to interact with charged ions or polar species and to reduce the strength of an electric field surrounding a charged particle that is immersed in the solvent. Applicants have determined that the solubility of salts can be extremely high in a wide range of aprotic polar organic solvents due to their large dipole moments and relatively high dielectric constants.

As previously mentioned, protic polar organic solvents have recently been used in the formulation of thermal insulating fluids. For the purposes of this disclosure, protic polar organic compounds shall include polar organic compounds that contain one or more hydroxyl groups. A hydroxyl group is a protic functional group linkage in which a hydrogen atom is bonded to an oxygen atom. The difference in electronegativities between the oxygen atom and the hydrogen atom in the hydroxyl group results in a polarization of the hydrogen atom (i.e. development of a partial positive charge at the hydrogen atom). As such, protic compounds readily engage in hydrogen bonding which facilitates their ability to solubilize salts.

Aprotic polar organic solvents, however, do not contain any hydroxyl groups, and therefore cannot act as hydrogen atom donors in hydrogen bonding. The solubility of salts in aprotic polar organic solvents is a consequence of the strong dipoles generated in the solvent molecules by the separation of partial positive and partial negative charges.

In accordance with embodiments of the invention, aqueous thermal insulating fluids comprising aprotic polar organic solvent(s) are able to dissolve salts at ambient temperature during formulation. However, Applicants have determined that substantially anhydrous thermal insulating fluids comprising aprotic polar organic solvent(s) generally require heating of the solvent(s) during formulation in order to effectively dissolve the salts. Applicants have further determined that the salts remain dissolved in the aprotic polar organic solvent even after the solvent is cooled to ambient temperature or temperatures significantly lower than ambient temperature. These properties of aprotic polar organic solvents permit the formulation of variable density thermal insulating fluids with thermal conductivities lower (sometimes significantly lower) than those observed with protic solvents.

FIG. 1 is a table listing several aprotic and protic solvents along with their dipole moments and dielectric constants at about 25° C. The electric dipole moments are given in units of Debyes while the dielectric constants are dimensionless quantities. Several of the aprotic polar organic solvents listed in FIG. 1 (e.g. N-methyl-pyrrolidone, dimethyl sulfoxide, and N,N-dimethylformamide) possess significantly larger dipole moments than any of the protic solvents listed in FIG. 1 (e.g. n-butyl alcohol, 2-propanol, ethanol, ethylene glycol). Further, these aprotic polar organic solvents in FIG. 1 exhibit higher dielectric constants than the majority of protic solvents listed. For example, dimethyl sulfoxide—an aprotic polar organic solvent—has a dipole moment of 4.10 at 25° C. which is larger than any of the other compounds listed in FIG. 1 and a dielectric constant of 48.9 at 25° C. which is higher than the dielectric constants of any of the other protic organic compounds listed.

In certain embodiments of the invention, each of the aprotic polar organic solvents included in the fluid formulation may have a dipole moment as measured at 25° C. that is about 2.0 Debyes or larger. Aprotic organic compounds that do not have dipole moments that fall within this range, for example, the ester and amine compounds listed in FIG. 1, are not included in the fluid formulations of these particular embodiments. In certain more specific embodiments of the invention, each of the aprotic polar organic solvents included in the fluid formulation may have a dipole moment as measured at 25° C. that is about 2.3 Debyes or larger.

Aprotic polar organic solvent(s) used in thermal insulating fluids according to various embodiments of the invention may comprise one or more of the following types of functional group linkages: an amide linkage, a nitrile linkage, a ketone linkage, an ether linkage, cyclic forms thereof. Further, oligomers, derivatives, mixtures, and combinations of such compounds may also be used. Specific examples of suitable aprotic polar organic solvents include, but are not limited to, acetone, methyl ethyl ketone, cyclohexanone, cyclopentanone, acetonitrile, dimethyl sulfoxide, formamide, dimethylformamide, dimethylacetamide, 2-pyrrolidone, N-methyl-2-pyrrolidone, hexamethylphosphoramide (HMPA), 1,4-dioxane, and tetrahydrofuran.

Thermal conductivity, k, is a measure of a material's ability to conduct heat. Thermal conductivity may be measured in the SI units of W/(K*m), or alternatively, in U.S. customary units of BTU/(ft*hr*° F.). Thermal resistivity is the reciprocal of thermal conductivity; therefore, the lower a material's thermal conductivity the higher its thermal resistivity.

Aprotic polar organic solvents generally exhibit considerably lower thermal conductivities than protic solvents. For example, Applicants have observed that amides have lower thermal conductivities compared to protic solvents such as alcohols. For example, the cyclic amide N-methyl-2-pyrrolidone (NMP) with a density of 8.6 lbs/bbl has a thermal conductivity of around 0.09 BTU/ft*hr*° F. as compared to thermal conductivities of 0.16 BTU/ft*hr*° F. and 0.11-0.12 BTU/ft*hr*° F. for the polyols glycerol and ethylene glycol, respectively, and a thermal conductivity of 0.35 BTU/ft*hr*° F. for water.

One or more embodiments of the invention are directed to thermal insulating fluids comprising an earth metal halide salt dissolved in an amide-based solvent. Until Applicants' conceived of their invention, conventional wisdom in the art was that amide-based solvents are relatively less polar compounds, and thus not capable of dissolving organic and inorganic salts as readily as aqueous and protic solvents. As such, it was believed that amide-based solvents are not suitable for use in the formulation of thermal insulating fluids. However, Applicants determined that due to their large dipole moments and relatively high dielectric constants as well as their low thermal conductivities, amide-based solvents are especially effective solvents for dissolving organic and inorganic salts, and thus are particularly suited for use in insulating fluid formulations.

In accordance with embodiments of the invention, use of the salt(s) and organic solvent(s) may be adjusted and controlled to produce thermal insulating fluids having favorable thermal and rheological properties. For example, salt may be added to the thermal insulating fluid to increase the density of the fluid to balance against the pressure of the formation fluid of a well. As such, salt may be added to maintain the density of the thermal insulating fluid to within a particular range, typically between about 9.0 to about 18 pounds per gallon (ppg).

As described earlier, both aqueous and substantially anhydrous thermal insulating fluids according to embodiments of the invention may comprise a mixture of aprotic and protic polar organic solvents. The relative proportions of aprotic and protic polar organic solvents in the mixture may be chosen so as to strike an appropriate balance between minimizing thermal conductivity of the fluid and minimizing the cost associated with producing the fluid. Low thermally conductive fluids formulated using mixture(s) of aprotic and protic polar organic solvents are less expensive to produce than those based solely on aprotic polar organic solvents which are invariably more expensive than protic polar solvents.

According to embodiments of the invention, if a lower thermal conductivity of the fluid is desired, then the proportion of aprotic polar organic solvent(s) in the mixture may be increased. Increasing the proportion of protic polar solvent(s) in the mixture, on the other hand, will generally lower the cost of producing the formulation. These two competing considerations may be balanced in dependence on any number of criteria including the particular application for which the fluid will be used, the well conditions, and the necessary specifications of the insulating fluid.

FIG. 2 is a table demonstrating the effect that an aprotic polar organic solvent has on the thermal conductivity of a fluid. In particular, FIG. 2 provides thermal conductivity measurements for three different fluid formulations, each formulation comprising 14.2 ppg calcium bromide in approximately the same percentage by volume and the protic polar organic solvent ethylene glycol and the aprotic polar organic solvent N-methyl-2-pyrrolidone (NMP) in varying proportions. As the data illustrates, formulation 1—which comprises 57% ethylene glycol by volume and no NMP—has a thermal conductivity of 0.18. Formulation 2—which comprises ethylene glycol and NMP in roughly the same percentage by volume—has a thermal conductivity of 0.17, lower than that of formulation 1. Moreover, formulation 3—which comprises 47% NMP by volume and no ethylene glycol—has the lowest thermal conductivity of all three formulations. Thus, the data in FIG. 2 clearly illustrates that increasing the amount of the aprotic polar organic solvent NMP in the fluid relative to the amount of the protic solvent ethylene glycol results in a lower thermal conductivity for the formulation.

Although embodiments of the invention encompass mixtures of aprotic and protic organic solvents formed in any proportion, Applicants have determined that mixtures formulated such that the ratio of the concentration of aprotic polar organic solvent(s) to the concentration of protic polar organic solvent(s) is at least about 1:4 or greater yield thermal insulating fluids having particularly low thermal conductivities.

FIG. 3 is a plot of the thermal conductivity of a mixture of NMP and ethylene glycol as a function of the percentage of NMP in the mixture. As can be seen, when the percentage of NMP in the mixture reaches about 20%, the thermal conductivity of the mixture begins to drop and continues to drop considerably until the percentage of NMP in the mixture reaches about 80% at which point the thermal conductivity begins to level off. Thus, increasing the proportion of NMP in the mixture with ethylene glycol advantageously yields a substantial reduction in the thermal conductivity of the mixture, particularly when the amount of NMP in the mixture is at or above about 20%. Further, Applicants observed the unexpected and advantageous result that when the percentage of NMP in the mixture is from about 20% to about 80% particularly low thermal conductivities are obtained. Thus, in accordance with one or more embodiments of the invention, when the ratio of the concentration of aprotic polar organic solvent(s) to the concentration of protic polar organic solvent(s) in the mixture is in the range of about 1:4 to about 4:1 or stated differently, when the proportion of aprotic polar organic solvent(s) in the mixture is in the range of about 20% to about 80%, unexpectedly low thermal conductivities are achieved.

Suitable types of aprotic polar organic compounds for use in mixtures of aprotic and protic polar organic solvents include any of those previously disclosed. Suitable types of protic polar organic compounds include alcohols, glycols, diols and polyols, glycol mono-ethers, polyglycols, and mixtures or combinations thereof. Specific examples of protic polar compounds that may be used include, but are not limited to, ethylene glycol, diethylene glycol, glycerol, ethanolamine, diethanolamine, and triethanolamine.

Various embodiments of the invention are directed to aqueous or substantially anhydrous thermal insulating fluids that comprise—in addition to one or more inorganic and/or organic salts and optionally a viscosifying agent—at least one polar organic solvent having one or more aprotic and one or more protic functional group linkages. As with mixtures of aprotic and protic polar organic solvents, the presence of aprotic polar functional groups in the organic solvent lowers the thermal conductivity of the thermal insulating fluid but may be accompanied by a concomitant increase in the cost of the formulation.

FIG. 4 provides thermal conductivities for various polar organic compounds comprising different types and numbers of aprotic and protic functional group linkages. As FIG. 4 shows, the thermal conductivity of an insulating fluid that includes an ether functional group linkage differs from that of the parent alcohol from which the ether is formed. For example, the thermal conductivity of a weighted monobutyl ether derived from diethylene glycol (DEGBE) is 0.09 BTU/ft*hr*° F. representing a 25% decrease from the thermal conductivity observed for its parent diethylene glycol (DEG).

In addition, Applicants have determined—as the data in FIG. 4 illustrates—that as the number of aprotic functional group linkages in the compound increases relative to the number of protic functional group linkages, the thermal conductivity of the compound decreases. For example, as previously discussed, a monobutyl ether of diethylene glycol which includes one alcohol linkage and two ether linkages has a thermal conductivity of 0.09 BTU/ft*hr*° F.—less than the thermal conductivity of diethylene glycol (0.12 BTU/ft*hr*° F.) which has two alcohol linkages and one ether linkage. Moreover, as shown in FIG. 4, those purely aprotic polar organic compounds that include several aprotic functional group linkages and no protic functional group linkages exhibit particularly low thermal conductivities. For example, dimethyl ether tetraethyleneglycol which comprises five ether linkages, monobutyl ether diethylene glycol acetate which comprises an ester linkage and two ether linkages, and diethylene glycol dibenzoate which comprises two ester linkages and one ether linkage each have a thermal conductivity of 0.06 BTU/ft*hr*° F. Moreover, cyclohexanone—another purely aprotic polar organic solvent that comprises a ketone linkage—has a thermal conductivity of 0.05 BTU/ft*hr*° F.

In a specific embodiment of the invention, a hydrocarbon chain associated with an aprotic functional group linkage in a polar organic solvent comprises at least three carbon atoms, and optionally at least four carbon atoms. For example, in an organic compound comprising two ether linkages and one ester linkage (e.g. R'''—O—R''—O—R'—COO—R), at least one of R''', R'', R', and R may comprise at least three carbon atoms, or in more specific embodiments, at least four carbon atoms. It should be noted that any of R''', R'', R', and R may represent the same organic chain or different organic chains. Applicants have determined that polar organic solvents having hydrocarbon chains comprising at least three carbon atoms exhibit particularly low thermal conductivity characteristics while still being able to adequately dissolve salts thereby making them excellent fluids for use in connection with oil and gas and other industrial applications.

Generally speaking, thermal insulating fluids according to embodiments of the invention have thermal conductivities that are similar to the thermal conductivities of the one or more polar organic solvents included in the formulation. Consequently, polar solvents comprising aprotic polar functional group linkages are particularly desirable. As previously mentioned, thermal insulating fluids that comprise aprotic polar organic solvent(s) or a mixture of aprotic and protic polar organic solvents exhibit lower thermal conductivities than fluids formed from protic polar solvents alone. Further, as the number of aprotic functional group linkages within a polar organic solvent increases relative to the number of protic functional group linkages, the thermal conductivity of the solvent decreases.

In addition to the trends described above, Applicants have also recognized that substantially anhydrous thermal insulating fluids typically exhibit lower thermal conductivities than aqueous thermal insulating fluids. As previously stated, anhydrous thermal insulating fluids according to one or more embodiments of the invention may be substantially free of added water in excess of any water that salt(s) and/or solvent(s) in the fluid may absorb from the atmosphere due to hygroscopic properties. In one or more embodiments, the only water present in the fluid is that which constitutes an impurity and/or that which is absorbed from the atmosphere. In some embodiments of the invention, the polar organic solvent in the fluid (e.g. certain aprotic polar organic solvents) may not exhibit hygroscopic properties, and thus the fluid may be essentially free of water.

FIG. 5 illustrates the effect of water on the thermal conductivities of various thermal insulating fluid formulations comprising NMP. As the data in FIG. 5 shows, the brine solutions have the highest thermal conductivities (0.29 BTU/ft*hr*° F. for the 11.6 ppg calcium chloride brine solution and 0.23 BTU/ft*hr*° F. for the 12.5 ppg calcium bromide solution). The data in FIG. 5 also shows that substantially anhydrous fluid formulations comprising NMP exhibit significantly lower thermal conductivities than corresponding aqueous formulations comprising NMP. For example, 11.6 ppg fluid formulations comprising NMP and zinc bromide and calcium bromide brines, respectively, each have a thermal conductivity of 0.10 BTU/ft*hr*° F. whereas a 11.6 ppg anhydrous formulation comprising NMP and weighted with zinc bromide has a thermal conductivity of 0.085 BTU/ft*hr*° F.

Further, increasing the percentage of salts or brine solution in the formulation has a considerably more pronounced impact on the thermal conductivity of the formulation in the case of aqueous formulations. As shown in FIG. 5, a 12.5 ppg formulation comprising a calcium bromide brine and NMP has a thermal conductivity of 0.17 BTU/ft*hr*° F. which is significantly higher than the thermal conductivity observed for the 11.6 ppg aqueous formulations. On the other hand, the 14.7 ppg anhydrous zinc bromide based formulation comprising NMP exhibits a thermal conductivity of 0.08 which is less than that observed for the 11.6 ppg anhydrous formulation. This characteristic is particularly advantageous because it allows for formulations comprising aprotic polar organic solvents to be weighted up with salts without an appreciable change in thermal conductivity.

As discussed in detail previously, aprotic polar organic solvents advantageously exhibit lower thermal conductivities than protic polar organic solvents while also being capable of dissolving salts as effectively as protic solvents. Similarly, thermal insulating fluids formulated from aprotic polar organic solvents according to embodiments of the invention have lower thermal conductivities as compared to protic solvent formulations. In addition, the thermal conductivity of a compound generally decreases as the number of aprotic functional group linkages in the compound increases relative to the number of protic functional group linkages.

Applicants have also determined that the thermal conductivity of an aprotic polar organic solvent decreases as the temperature of the solvent increases. Thus, downhole fluids that comprise aprotic polar organic solvents rather than protic polar organic solvents alone exhibit not only highly favorable thermal conductivities at the high temperatures encountered in a wellbore environment but also advantageously exhibit a decrease in thermal conductivity as the wellbore temperature increases.

Figures 6A, 6B:
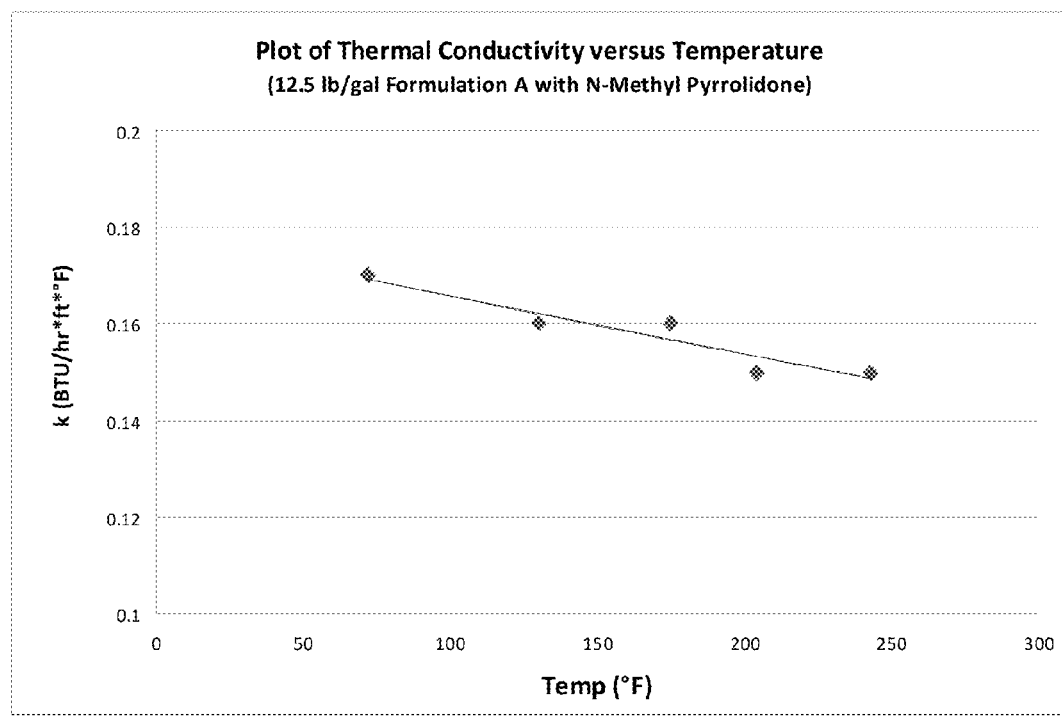
FIG. 6A is a table providing thermal conductivity measurements at different temperatures for a 12.5 ppg thermal insulating fluid comprising N-methyl-2-pyrrolidone.
FIG. 6B is a plot of thermal conductivity as a function of temperature for the data shown in FIG. 6A.

FIG. 6A shows thermal conductivity data at different temperatures for a 12.5 ppg fluid formulation comprising NMP. The formulation includes 0.69 bbl of 14.2 ppg calcium bromide brine, 0.24 NMP, and 0.075 bbl of viscosifier. As the data shows, the thermal conductivity of the fluid decreases from a high measurement of 0.17 BTU/ft*hr*° F. at 72° F. to a low measurement of 0.15 BTU/ft*hr*° F. at 243° F. FIG. 6B is a plot of the data shown in FIG. 6A and shows an approximately linear decrease in thermal conductivity with an increase in temperature.

Downhole fluids may encounter convection effects in the wellbore environment which can reduce their insulating abilities. Formulating downhole fluids with particularly high viscosities in order to counteract these convection effects is known in the art. However, the especially low thermal conductivities exhibited by aprotic polar organic solvent formulations advantageously mitigate the need for fluid formulations having especially high viscosities.

Figures 7A, 7B:
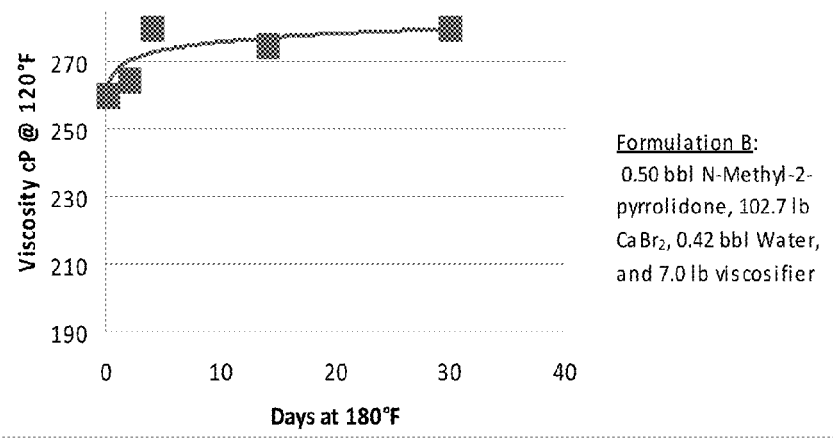
FIG. 7A is a table that provides fluid viscosity values at various time intervals for different fluid formulations.
FIG. 7B is a plot of fluid viscosity as a function of time for one of the fluid formulations provided in FIG. 7A.

Moreover, thermal insulating fluids comprising an aprotic polar organic solvent such as NMP demonstrate good thermal stability at high wellbore temperatures. FIG. 7A depicts a table of fluid viscosities at various time intervals for different fluid formulations. FIG. 7B is a plot of fluid viscosity as a function of time for one of the fluid formulations provided in FIG. 7A.

The formulations for which fluid viscosity data is provided in FIG. 7A each comprise the aprotic polar organic solvent NMP but differ in the amount of salts, water, and polymer(s) included in the fluid. As shown in FIG. 7A, each of the formulations exhibits a negligible change in fluid viscosity over time despite the differences in composition. FIG. 7B depicts a plot of fluid viscosity values as a function of time for thermal insulating fluid B. Formulation B includes 0.50 bbl NMP, 102.7 lbs calcium bromide, 0.42 bbl water, and 7 lbs of viscosifier. The plot in FIG. 7B reflects the data in FIG. 7A showing that Formulation B undergoes a negligible change in viscosity over the period of one month.

Aprotic polar organic solvents and polymers may strongly bind water molecules. NMP forms relatively strong bonds with water molecules, whereas other less polar aprotic organic solvents such as ethers with medium length hydrocarbon groups bind water molecules less strongly. As a consequence, as with many protic solvents (or polymers), certain aprotic polar organic solvents such as NMP may be used in insulative fluids to inhibit gas hydrate formation.

The ability to bind water is often measured by "water activity" (relative humidity) values using a hygrometer. FIG. 8 shows that the ability of NMP to bind water is comparable to that of ethylene glycol, a well-known thermodynamic gas hydrate inhibitor. Diethylene glycol monobutyl ether—a polar organic compound comprising both aprotic and protic polar functional group linkages—has a relative humidity of 78%. This demonstrates the poor ability of ether given a combination with a protic linkage to bind water. Gas hydrate inhibition can be an important and desirable property of insulating fluids. The added benefit of certain aprotic polar organic solvents such as NMP to function as gas hydrate inhibitors was unknown in the art until Applicants invention.

Another advantage of aprotic polar organic compounds is that they typically demonstrate lower corrosivity than protic compounds. Thus, both aqueous and substantially anhydrous thermal insulating fluids comprising an aprotic polar organic solvent according to embodiments of the invention are less corrosive than fluids formed from protic solvents alone. Moreover, aqueous thermal insulating fluids according to embodiments of the invention are also less corrosive than conventional aqueous fluids because they comprise only a minimal amount of water needed to hydrate or solubilize viscosifying agent(s) present in the fluid. The less corrosive nature of aqueous and substantially anhydrous thermal insulating fluids comprising aprotic polar organic solvent(s) is particularly advantageous when the fluid is used in connection with wellbore environments containing tools, drillpipe, drill casing, and/or production tubing that are vulnerable to corrosion. Although corrosion inhibiting chemicals are often added to fluids used in oil and gas applications, with aprotic formulations according to embodiments of the invention less of the chemicals are needed.

In various embodiments of the invention, thermal insulating fluids comprising aprotic polar organic solvent(s) may exhibit a considerably lengthened cool-down time. The cool-down time of a fluid is dependent on both the thermal conductivity and the viscosity of the fluid and is directly correlated to the U value of the fluid which is a measure of its thermal conductivity over a given distance. Because fluids formulated in accordance with embodiments of the invention exhibit particularly low thermal conductivities as compared to conventional fluids, longer cool-down times are obtainable at lower fluid viscosities.

Thermal insulating fluids according to one or more embodiments of the invention may comprise one or more additives. The additives may comprise one or more of the following: corrosion inhibitors, bridging agents, sized particulates, buffers, lubricants, breakers, stabilizers, chelants, scale inhibitors, clays, polymers, tackifying agents, gelling agents, co-solvents, viscosity modifiers, wetting agents, fluid loss control agents, proppants for use for example in connection with hydraulic fracturing, hydrate inhibitors, oxygen scavengers, surfactants, biocides, emulsifiers and mixtures or combinations thereof.

In other embodiments, the thermal insulating fluid may be essentially free of chemical additives. For example, the thermal insulating fluid may be essentially or completely free of any additives that may serve to enhance the solubility of the salts in the fluid such as, for example, a chelating ligand. Additionally, the fluid may be free of additives used to stabilize the mixture, such as emulsifying agents. The thermal insulating fluid may inherently exhibit favorable properties without the introduction of additional additives. For example, the fluid may be inherently viscous, and thus may not require the introduction of viscosifying agents or viscosity modifiers. In addition, the fluid may be free of surfactants.

Insulating fluids according to certain embodiments of the invention may further be free of any other additives that enhance the chemical and/or physical properties of the fluid. Such additives may include fluid loss control agents, bridging agents, sized particulates, buffers, corrosion inhibitors, lubricants, surfactants, breakers, bactericides, cross-linkers, stabilizers, chelants, scale inhibitors, corrosion inhibitors, hydrate inhibitors, clays, polymers, tackifying agents, gelling agents, co-solvents and weight-up agents.

Fluid formulations according to certain embodiments of the invention may be free of an ionic liquid. An ionic liquid for the purposes of this disclosure shall be defined as a salt in the liquid phase that comprises only anions and cations of the salt. In addition, fluid formulations according to certain embodiments of the invention may be solids-free. That is, the fluid formulations may be devoid of any compounds in solid phase.

A method for formulating an aqueous thermal insulating fluid is disclosed. The method comprises: slowly adding a viscosifying agent with strong mixing to an aqueous solution comprising one or more inorganic and/or organic salts. The viscosifying agent may be, for example, a polyacrylic polymer or a co-polymeric blend. Solid salt(s) may be added to the mixture along with the viscosifying agent or at a later time. Further, various additives such as corrosion inhibitors, etc. may be present in the formulation at the time of addition of the viscosifying agent or may be added a later time. The addition of excess water is generally not required for hydration or solubilization of the polymer.

The method further comprises adding at least one of: one or more aprotic polar organic solvents, one or more polar organic solvents comprising aprotic and protic functional group linkages, and a mixture of at least one aprotic polar organic solvent and at least one protic polar organic solvent to the formulation and mixing the resulting fluid for at least about 45 minutes. Mixing is continued until the fluid is clear. Care should be taken so as to avoid entrainment of air in the fluid formulation due to excessively rapid mixing. Additional aprotic and/or protic organic solvents may be added to the formulation as well. The method is generally carried out at ambient temperature and may be modified depending on the nature of the polymer(s) and/or the solvent(s) used.

A method for formulating a substantially anhydrous thermal insulating fluid is also disclosed. The method comprises dissolving—at an elevated temperature—one or more salts in one or more polar organic solvents including at least one of: one or more aprotic polar organic solvents, one or more polar organic solvents comprising aprotic and protic functional group linkages, and a mixture of at least one aprotic polar organic solvent and at least one protic polar organic solvent. The method further comprises adding one or more viscosifying agents to the formulation and cooling the resultant formulation to ambient temperature or a temperature below ambient temperature.

The method for formulating an aqueous thermal insulating fluid and/or the method for formulating a substantially anhydrous thermal insulating fluid may, in certain embodiments, further comprise: increasing a concentration of aprotic polar organic solvent(s) relative to a concentration of protic polar organic solvent(s) in order to lower the thermal conductivity of the fluid.

A method of introducing a fluid according to any embodiment of the invention into a wellbore is also disclosed. The method comprises: introducing the fluid into the wellbore; and using the fluid as at least one of: a fracturing fluid, a packer fluid, a completion fluid, a drilling fluid, a workover fluid, and a thermal insulating fluid.

As previously disclosed, the particularly low thermal conductivities achieved by fluids that include polar organic solvents having aprotic functional group linkage(s) make them excellent candidates for use as insulating fluids in wellbore applications. However, given the effectiveness with which a wide range of aprotic polar organic solvents are able to solubilize salts to produce variable density fluids, low thermally conductive fluids comprising aprotic polar organic solvent(s) according to embodiments of the invention may be used in numerous capacities in connection with not only oil and gas applications (e.g. as insulating fluids, packer fluids, completion fluids, workover fluids and fracturing fluids), but across a wide range of industries beyond oil and gas as well such as, for example, heat traps, insulating fluids, refrigerants, hydraulic fluids, etc.

Furthermore, substantially anhydrous fluids comprising aprotic polar organic solvent(s) according to embodiments of the invention are particularly useful in applications requiring fluids that demonstrate favorable thermal conductivity while having minimal water content. For example, substantially anhydrous fluids disclosed herein are particularly useful as fracturing fluids where formation damage by water might be an issue. Moreover, because substantially anhydrous fluids disclosed herein are capable of being weighted up to generate high density fluids, such fluids advantageously do not require as much pressure when being pumped into a wellbore.

While the invention has been described and illustrated in detail with reference to one or more embodiments and modifications thereof, it should be understood by those skilled in the art that other embodiments are encompassed within the invention.

What is claimed is:

1. A fluid formulated to have low thermal conductivity, the fluid comprising a mixture of:
   one or more salts selected from the group consisting of: an inorganic salt, an organic salt, and mixtures thereof;
   a mixture of N-methyl-2-pyrrolidone (NMP) and ethylene glycol, wherein NMP comprises about 20% to about 80% of the mixture of NMP and ethylene glycol such that the ratio of the by concentration of NMP to the concentration of ethylene glycol in the mixture is in the range of about 1:4 to about 4:1 in order to lower the thermal conductivity of the mixture; and
   one or more viscosifying agents,
   the one or more salts is added in an amount sufficient to maintain the density of the fluid between about 9.0 lb/gal to about 18.0 lb/gal,
   wherein the fluid is without an amine solvent, and wherein the fluid is substantially anhydrous.

2. The fluid of claim 1, wherein the one or more salts are selected from the group consisting of: halides of alkali, alkaline earth and transition metals, formates of alkali, alkaline earth and transition metals, acetates of alkali, alkaline earth and transition metals, and combination or mixtures thereof.

3. The fluid of claim 1, wherein the one or more viscosifying agents are selected from the group consisting of: scerloglucan, polyacrylic polymers and derivatives thereof, inorganic polymers, mixtures of acrylic acid and 2-acrylamido-2-methylpropanesulfonic acid, co-polymers of acrylic acid and 2-acrylamido-2-methylpropanesulfonic acid, polymers of vinyl pyrrolidone, polymers of polyacrylic derivatives, polymers having cationic monomeric species, polymers having anionic monomeric species, a mixture of one or more polymers and one or more salts, and mixtures, combinations, and derivatives thereof.

4. The fluid of claim 1, wherein the fluid is free of a cross-linking agent.

5. The fluid of claim 1, wherein the fluid is introduced into a wellbore for use as at least one of: a fracturing fluid, an insulating fluid, a packer fluid, a completion fluid, a workover fluid, and a drilling fluid.

\* \* \* \* \*